(No Model.)
J. PEGGS.
MOTOR FOR OPERATING CHURNS.
No. 423,805. Patented Mar. 18, 1890.
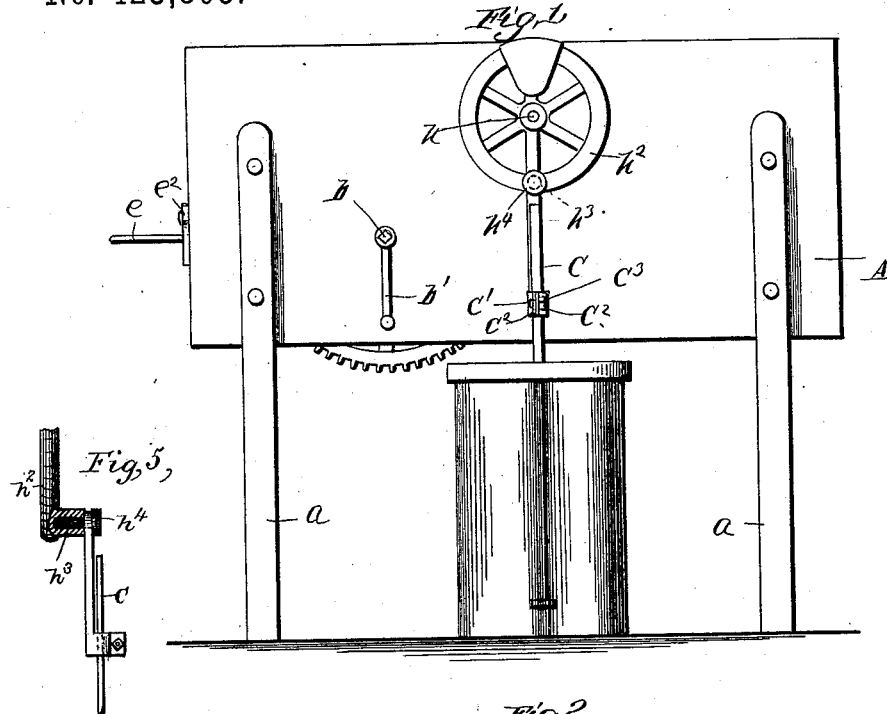
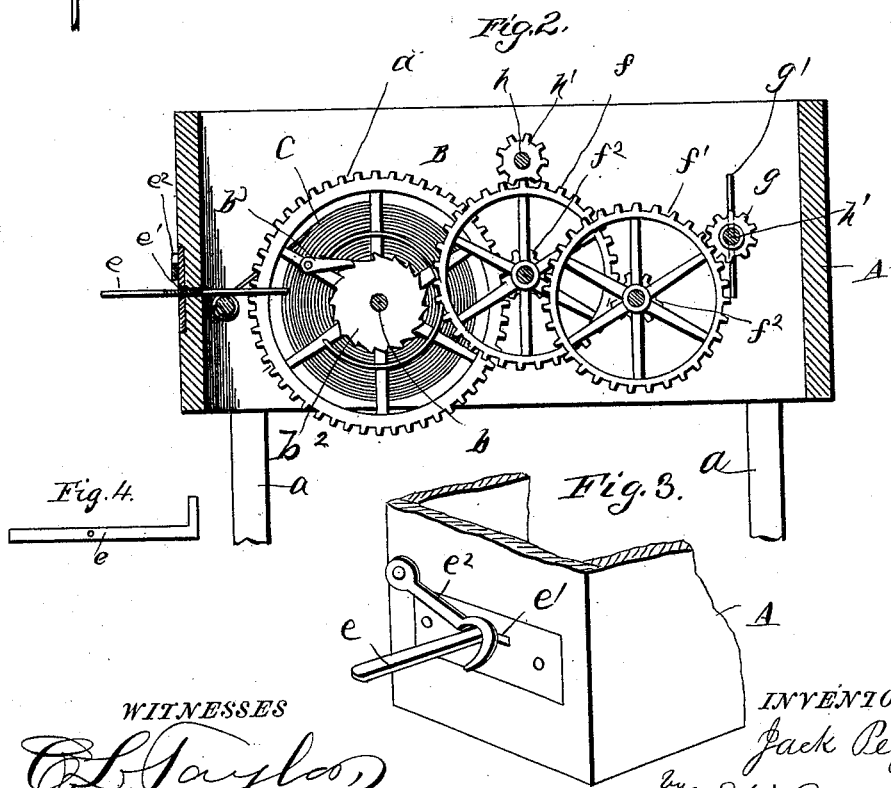
WITNESSES
INVENTOR
Jack Peggs,
by E. W. Anderson,
Attorney

UNITED STATES PATENT OFFICE.

JACK PEGGS, OF MILFORD, TEXAS.

MOTOR FOR OPERATING CHURNS.

SPECIFICATION forming part of Letters Patent No. 423,805, dated March 18, 1890.

Application filed September 16, 1889. Serial No. 324,000. (No model.)

*To all whom it may concern:*

Be it known that I, JACK PEGGS, a citizen of the United States, and a resident of Milford, in the county of Ellis and State of Texas, have invented certain new and useful Improvements in Motors for Operating Churns; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view. Fig. 2 is a vertical longitudinal section. Fig. 3 is a detailed (partly broken) perspective view of one end of the closure and certain parts thereat. Fig. 4 is a detached view of the right-angle lever, and Fig. 5 is an enlarged broken detail view of the wrist-pin and link-connection of the dasher-shaft.

This invention relates to certain improvements in churn-powers; and it consists of the novel combination of parts and their construction, as will fully appear from the following description and accompanying illustrations.

In accordance with my invention, I provide a suitable closure A, which may be open at top and bottom, and which is mounted upon legs or standards $a\ a$. In this case I dispose gear mechanism B, its frame-work being secured to the sides of said closure. This mechanism comprises a principal shaft $b$, one end of which extends out through one side of the closure A, and is adapted to be turned by the application thereto of a key $b'$, to put under tension a strong flat spring $c$, one end of which is fastened to said shaft and the other end to a cross-bar of the frame-work of the gear mechanism. Upon the shaft $b$ is a large loose cog or tooth wheel $d$, engaged therewith by a ratchet-wheel $b^2$, fast upon said shaft, and a spring-pressed pawl $b^3$, pivoted to wheel $d$ and engaging the ratchet-wheel $b^2$. Adapted to enter the interspaces between and to engage the spokes of the wheel $d$ is a right-angle brake-lever $e$, hung or pivoted in a slot $e'$ in one end of the closure A, and engaged or held, when the machine is in operation, out of engagement with said wheel by a hook $e^2$, pivoted to the same end of the closure. $f\ f'$ are two smaller cog-wheels of about the same diameter, and having their shafts carrying trundle wheels or pinions $f^2\ f^2$, one gearing with the wheel $d$ and the other geared to the wheel $f$. The wheel $f'$ is geared to a similar trundle-wheel $g$ on a shaft carrying a regulator $g'$, in the form of a plate, centrally secured to the shaft. $h$ is the driving-shaft, also engaged by a trundle-pinion $h'$ with and receiving motion from the wheel $f$, said shaft extending out through one side of the closure A and carrying a counterbalanced wheel $h^2$. Diametrically opposite the counter-balance of the wheel $h^2$ is eccentrically connected to said wheel a stud $h^3$, into which screws a headed wrist-pin $h^4$.

C is a pitman or link, which is loosely connected at one end to the wrist-pin $h^4$, and which carries at its opposite end a split socket C' to receive the upper end of the dasher-staff. At the edges of its split or slitted portion the socket C' is provided with jaws $C^2$ $C^2$, which are engaged by a binding-screw $C^3$, and whereby the dasher-staff is readily attached to and detached from said socket. It will be seen that a rapid up-and-down stroke is imparted through this pitman and socket connection to the dasher-staff without any dead-center to overcome, and that a storage of sufficient and effective power may be obtained to secure the best result in the churning operation in a minimum time.

Having thus fully described this invention, what I claim, and desire to secure by Letters Patent, is—

The churn-power comprising the clockwork-like mechanism, the right-angle brake-lever engaging the spring-shaft wheel of said mechanism, and itself engaged by a pivoted hook on the supporting closure, the wheel on the driving-shaft having eccentrically connected thereto a stud engaged by a wrist-pin, the pitman loosely connected at one end to said wrist-pin and carrying at its opposite end a split socket provided with jaws having a binding-screw, and the dasher-staff having connection with said pitman-socket, substantially as set forth.

In testimony whereof I affix my signature in presence of two witnesses.

JACK PEGGS.

Witnesses:
W. T. M. DICKSON,
C. L. WILSON.